United States Patent [19]

Huang

[11] Patent Number: 5,494,323
[45] Date of Patent: Feb. 27, 1996

[54] FASTENERS

[76] Inventor: Yu-Hwei Huang, No. 7, Alley 2, Lane 85, Min Tsu Rd., Lu chou Hsiang, Taipei Hsien, Taiwan

[21] Appl. No.: 219,696

[22] Filed: Mar. 29, 1994

[51] Int. Cl.⁶ .................................................. E05C 19/04
[52] U.S. Cl. .............................. 292/252; 24/628; 24/635; 24/453; 411/348
[58] Field of Search ............................ 24/453, 607, 606, 24/634, 635, 628; 411/348, 347; 292/252, DIG. 50, DIG. 37, DIG. 42

[56] References Cited

U.S. PATENT DOCUMENTS

| | | | |
|---|---|---|---|
| 2,472,651 | 6/1949 | Diaper | 24/607 |
| 2,593,662 | 4/1952 | Dickinson | 292/252 |
| 2,693,980 | 11/1954 | Heidman, Jr. | 24/607 X |
| 3,037,256 | 6/1962 | Chapman | 411/348 X |
| 3,085,462 | 4/1963 | Myers | 24/453 X |

FOREIGN PATENT DOCUMENTS

| | | | |
|---|---|---|---|
| 2357200 | 2/1978 | France | 24/607 |
| 951616 | 3/1964 | United Kingdom | 24/453 |

*Primary Examiner*—James R. Brittain
*Attorney, Agent, or Firm*—Pro-Techtor International

[57] ABSTRACT

A fastener includes a casing having a stepped center through hole and a plurality of steel balls in radial holes thereof around the stepped center through hole, a control bolt formed of a press knob element and an actuating element and received in the stepped center through hole, and a spring mounted around the control bolt, and wherein the steel balls are completely received inside the radial through holes permitting the casing to be separated from the control bolt.

2 Claims, 13 Drawing Sheets

5,494,323

FASTENERS

BACKGROUND OF THE INVENTION

The present invention relates to fasteners for sealing the opening of a container or fastening two parts together allowing them to be quickly opened.

The cap of a regular perfume bottle is commonly fastened to the bottle neck through a screw or swivel joint. Therefore, it is not easy to close or open the cap. When opening the cap, the bottle body must be firmly held in position or it may be tilted causing the perfume to fly about.

There is a kind of bottle plug for sealing the bottle neck of a perfume bottle, comprised of a cylindrical casing and a control bolt inserted into a center through hole on the casing. This structure of bottle plug is easy to operate in closing or open the perfume bottle. However, because the casing is made of metal, it is difficult to mount the control bolt within the center through hole of the casing.

Furthermore, storage or chest boxes may have to be closed by fasteners when thinks are put therein. In order for quick opening the boxes, the fasteners must be properly selected. However, regular fasteners cannot be quickly opened simply by pulling it upwards. The procedure to open regular fasteners is commonly complicated.

SUMMARY OF THE INVENTION

The present invention has been accomplished under the aforesaid circumstances. According to one embodiment of the present invention, a fastener is comprised of casing having a stepped center hole and a plurality of radial through holes with a respective steel ball respectively disposed around the stepped center hole, a control bolt formed of a press knob element and an actuating element longitudinally connected and received in the stepped center hole within the casing, and a spring disposed inside the stepped center hole of the casing and mounted around the control bolt and stopped between the press knob element and a shoulder portion inside the casing. The steel balls are forced by the actuating element of the control bolt to partially project out of either radial through hole and engaged to an inside annular groove on the bottle neck of a perfume bottle, and therefore the bottle neck of the perfume bottle is sealed. The steel balls are completely received inside the radial through holes permitting the fastener to be removed from the bottle neck of the perfume bottle when the press knob element is depressed to lower the tapered surface of the actuating element to the elevation of the steel balls.

DETAILED DESCRIPTION OF THE PREFERRED EMBODIMENTS

Figure 1:
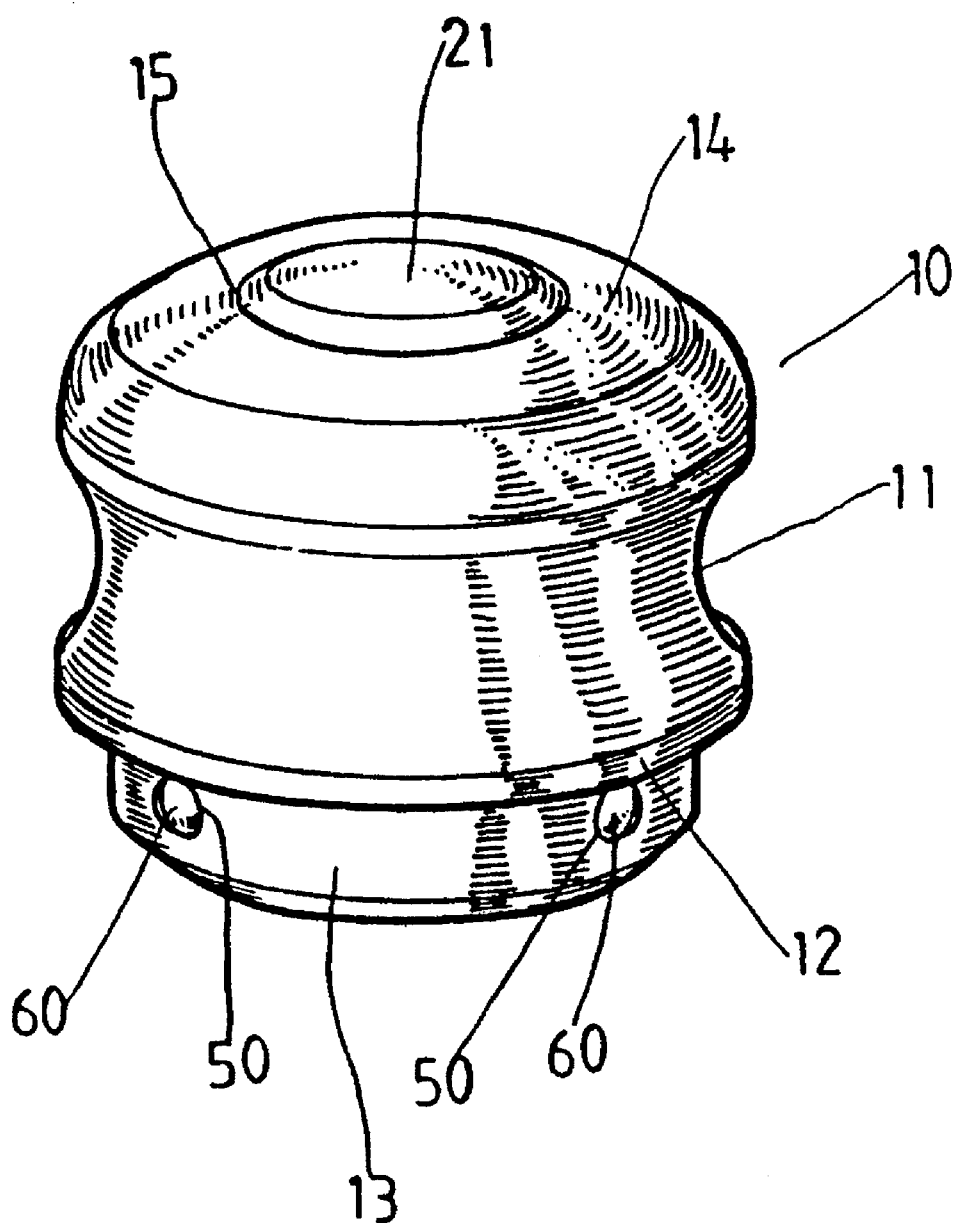
FIG. 1 is an elevational view of a fastener according to a first embodiment of the present invention.
Figure 2:
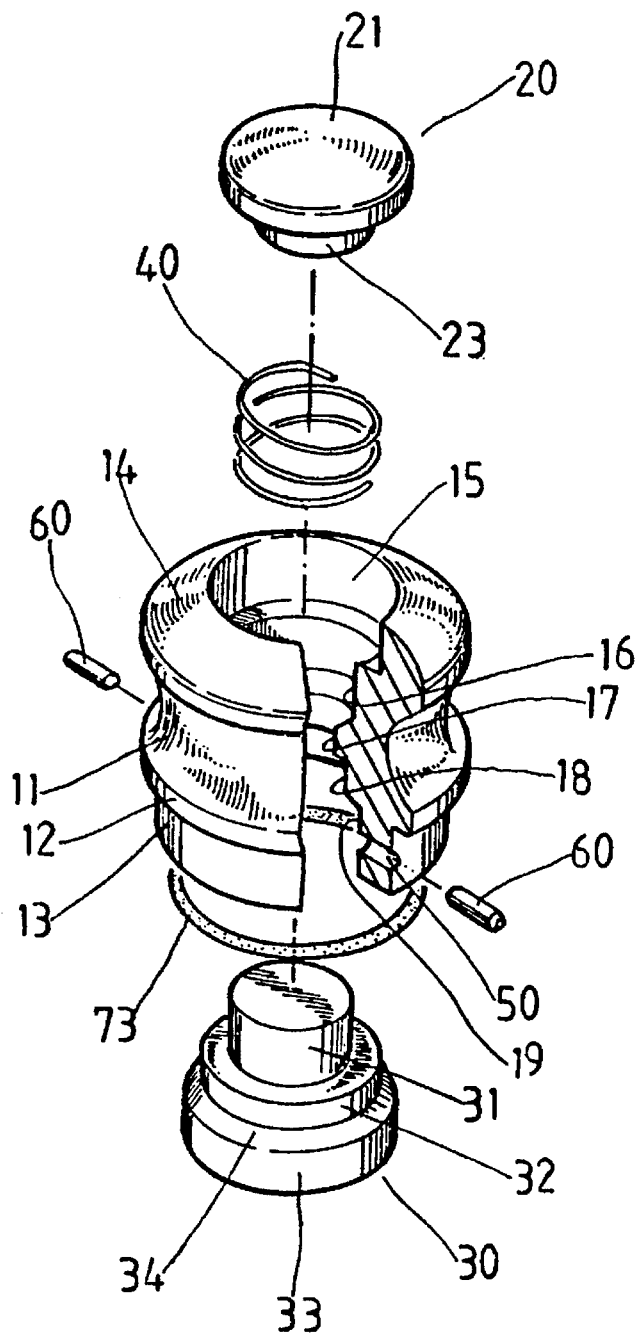
FIG. 2 is an exploded view and partially cutaway of the fastener shown in FIG. 1.

Referring to FIGS. 1 and 2, the casing, referenced by 10, is made from plastics through an injection molding process of substantially cylindrical shape, having a smoothly curved annular groove 11 around the periphery for the holding of the fingers, an annular flange 12 around the annular groove 11 at the bottom. The top 14 is shaped like a dome. A stepped through hole is made through the center of the top 14, comprised of a first center hole 15 at the top, a second center hole 16 vertically extended downwards from the first center hole 15 and having an inner diameter smaller than that of the first center hole 15, a third center hole 17 vertically extended downwards from the second center hole 16 and having an inner diameter smaller than that of the second center hole 16, a fourth center hole 18 vertically extended from the third center hole 17 and made gradually bigger toward the bottom and having its smallest inner diameter (namely, the inner diameter of its topmost end) made bigger than the inner diameter of the third center hole 17, and a fifth center hole 19 vertically extended from the fourth center hole 18 and made gradually bigger toward the bottom and having its smallest inner diameter (namely, the inner diameter of its topmost end) made bigger than the inner diameter of the fourth center hole 18. Therefore, a shoulder is formed between either two adjacent center holes. Furthermore, a plurality of radial through holes 50 are made on the bottom 13 of the casing 10, which receives a respective steel ball 60.

A press knob element 20 and an an actuating element 30 which are of injection-molded plastics and form a control bolt are respectively inserted in the stepped center hole from two opposite ends and then joined through a high-frequency sealing process. Alternatively, the press knob element 20 and the actuating element 30 may be connected through a screw joint or any of a variety of suitable fastening procedures or devices. The press knob element 20 comprises a dome-like head 21, which when inserted in the first center hole 15 is disposed in mesh with the dome-like top 14 of the casing 1, and a stepped rod formed of a top rod section 22 and a bottom rod section 23 and perpendicularly extended from the center of the dome-like head 21 at the bottom (see FIG. 3). The actuating element 30 is shaped like a stepped rod comprised of a top rod section 31 longitudinally connected to the bottom rod section 23 of the press knob element 20, an intermediate rod section 32 received in the fourth center hole 18, a bottom rod section 33 received in the fifth center hole 19, and a tapered surface 34 joined between the intermediate rod section 32 and the bottom rod section 33 and stopped at the shoulder between the fourth center hole 18 and the fifth center hole 19.

There is a coil spring 40 mounted around the bottom rod section 23 of the press knob element 20 and the top rod section 31 of the actuating element 30 and stopped between the shoulder formed between the top rod section 22 and the bottom rod section 23 and the shoulder formed between the second center hole 16 and the third center hole 17.

Figure 3:
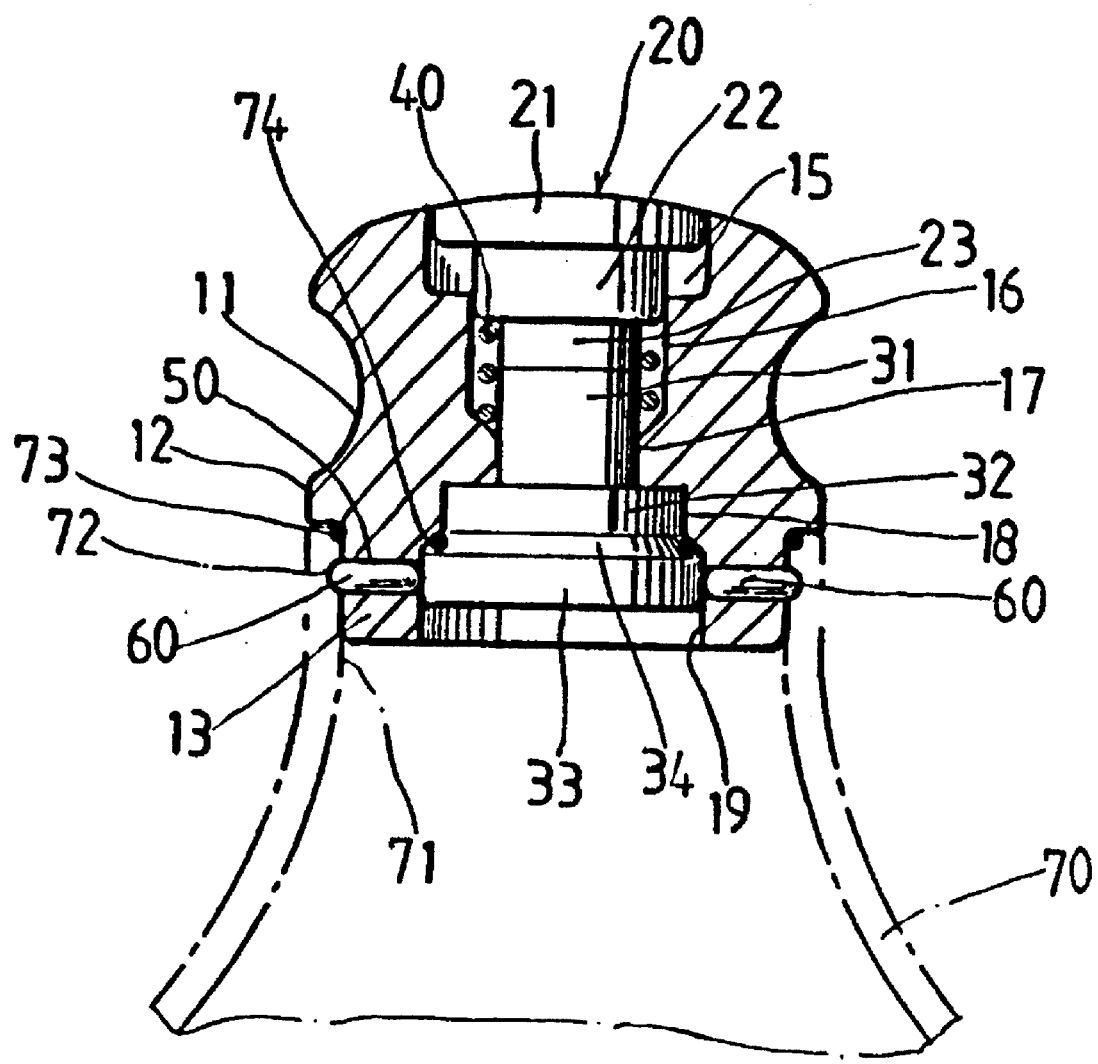
FIG. 3 is a sectional view showing the fastener of FIG. 1 sealed in the top opening of a perfume bottle.

Referring to FIG. 3, the fastener of the aforesaid structure may be used as the plug cap of a perfume bottle or the like. As illustrated, the bottle 70 has an inside annular groove 72 around the top opening 71 thereof. When the bottom 13 of the casing 10 is inserted into the top opening 71 of the bottle 70, the steel balls 60 are forced by the bottom rod section 33 of the actuating element 30 to partially project out of the radial holes 50 and to engage into the inside annular groove 72 causing the fastener retained to the bottle 70 to seal the top opening 71. Water sealing rings 73;74 may be respectively sealed between the top of the bottle 70 and the flange 12 of the casing 1 and between the actuating element 30 and the fourth center hole 18.

Figure 4:
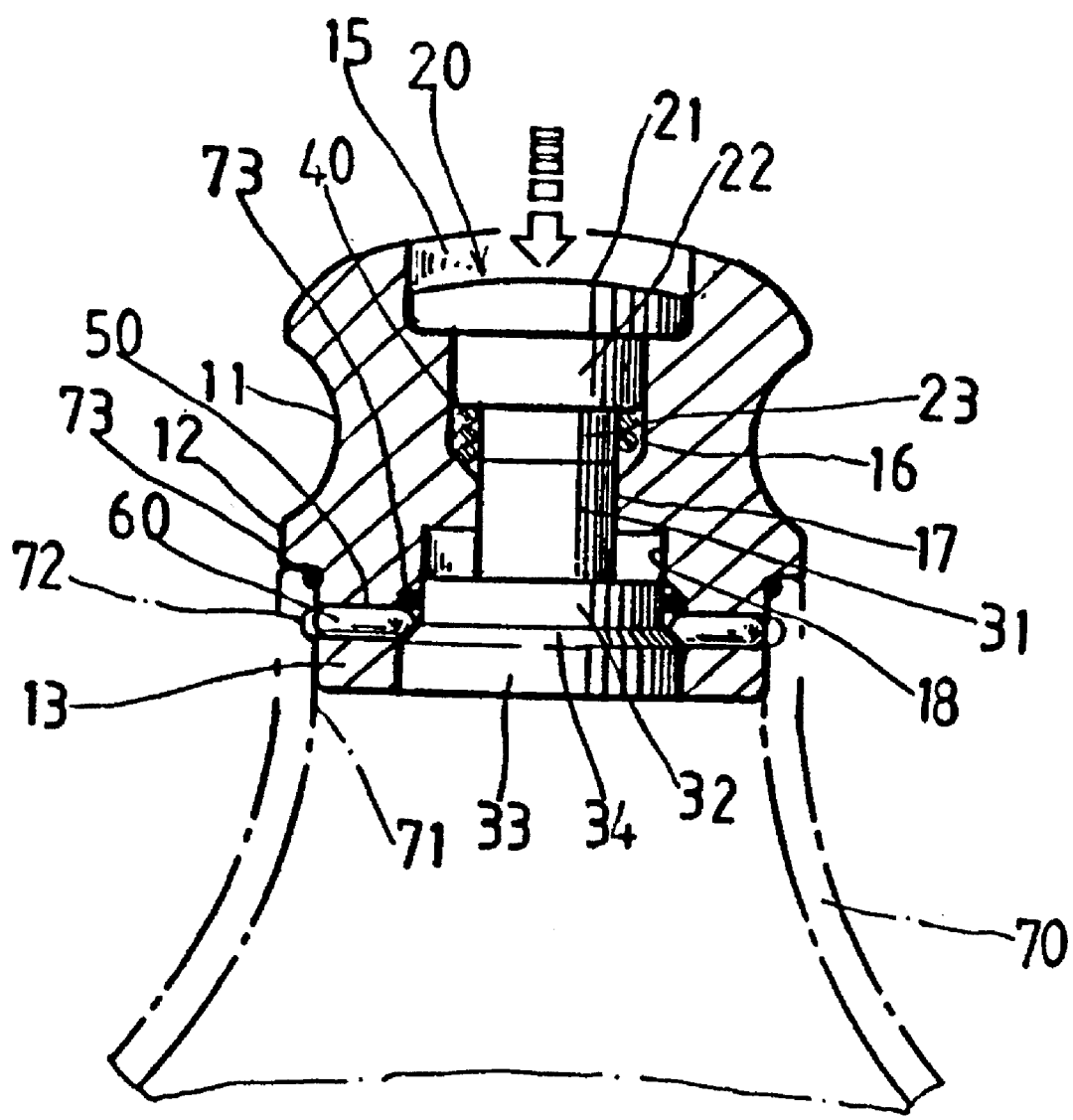
FIG. 4 is similar to FIG. 3 but showing the press knob element depressed.

Referring to FIG. 4, when the press knob element 20 is depressed, the coil spring 40 is compressed by the top rod section 22 of the press knob element 20, and tapered surface 34 of the actuating element 30 is moved downwards to the elevation of the steel balls 60 permitting the steel balls 60 to move backwards from the inside annular groove 72, and therefore the fastener can be removed from the top opening 71 of the bottle 70 by clamping the fingers on the annular groove 11 and then pulling the casing 10 out of the top opening 71 of the bottle 70.

Figure 5:
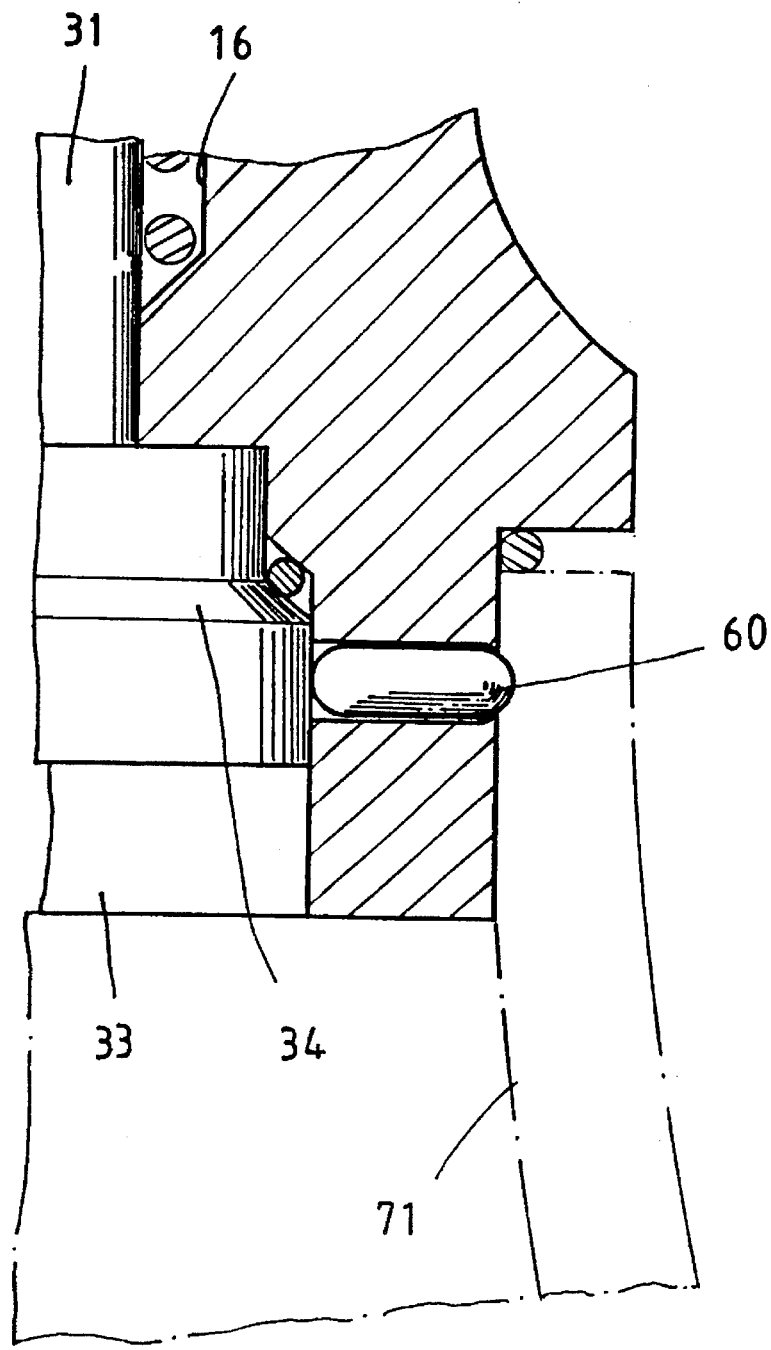
FIG. 5 is a partial view in an enlarged scale of FIG. 3.

Referring to FIG. 5 and FIG. 4 again, when the press knob element 20 is released from the pressure as the casing 10 is maintained inside the top opening 71 of the bottle 70, the press knob element 20 and the actuating element 30 are moved to their former positions, causing the steel balls 60 to engage into the inside annular groove 72 again, and therefore the fastener seals the top opening 71 of the bottle 70 again.

Figure 6:
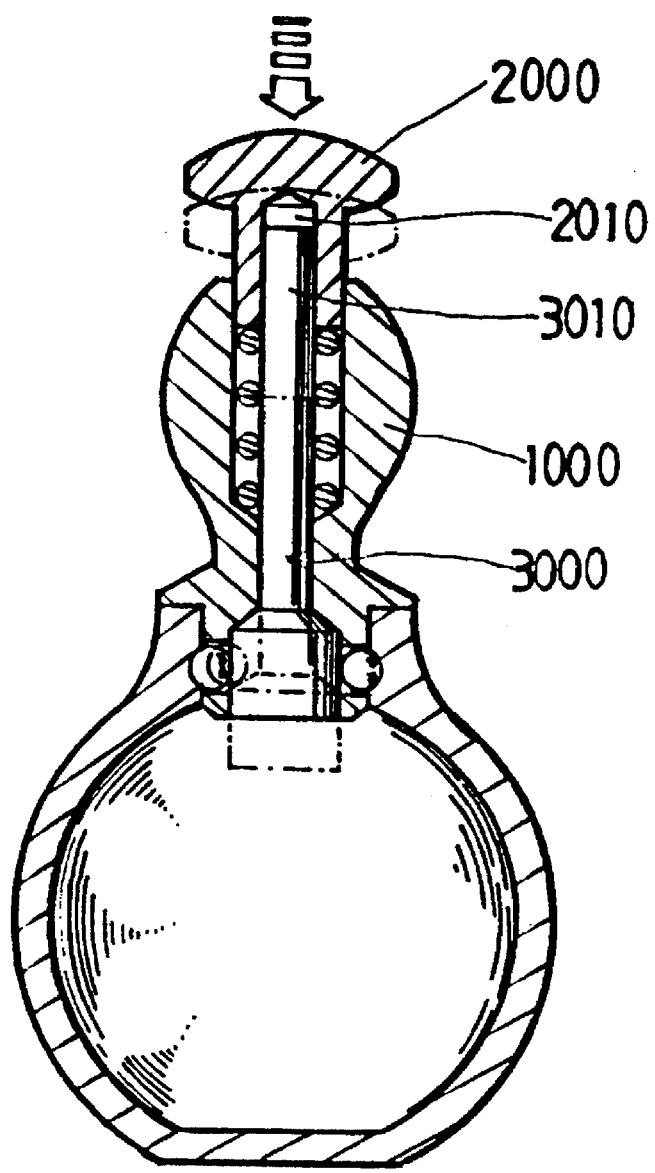
FIG. 6 is a longitudinal view in section of a fastener according to a second embodiment of the present invention.

Referring to FIG. 6, therein illustrated is a fastener according to a second embodiment of the present invention. Similar to the aforesaid first embodiment of the present invention, the fastener of the second embodiment of the present invention comprises a casing 1000 and a control bolt formed of a press knob element 2000 and an actuating element 3000. The press knob element 2000 has a plug hole 2010 at the bottom into which the top end 3010 of the actuating element 3000 fits.

Figure 7:
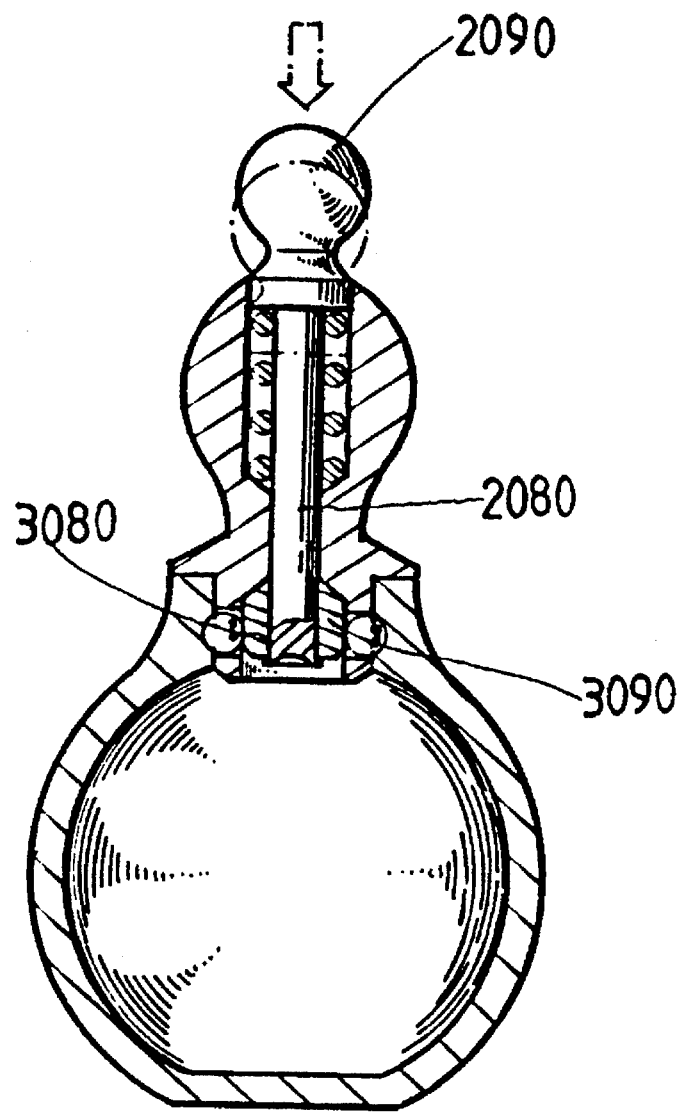
FIG. 7 is a longitudinal view in section of a fastener according to a third embodiment of the present invention

Referring to FIG. 7, therein illustrated is a fastener according to a third embodiment of the present invention, in which the press knob element 2090 has an elongated bottom rod 2080 fitted into a plug hole 3080 on the actuating element 3090.

Figure 8:
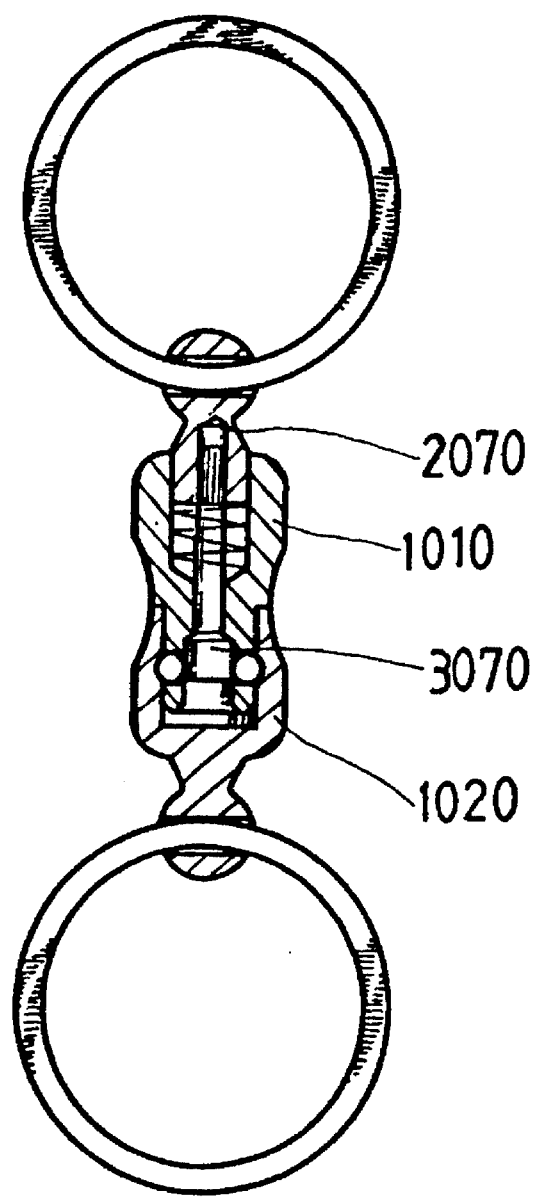
FIG. 8 is a longitudinal view in section of a fastener according to a fourth embodiment of the present invention.
Figure 9:
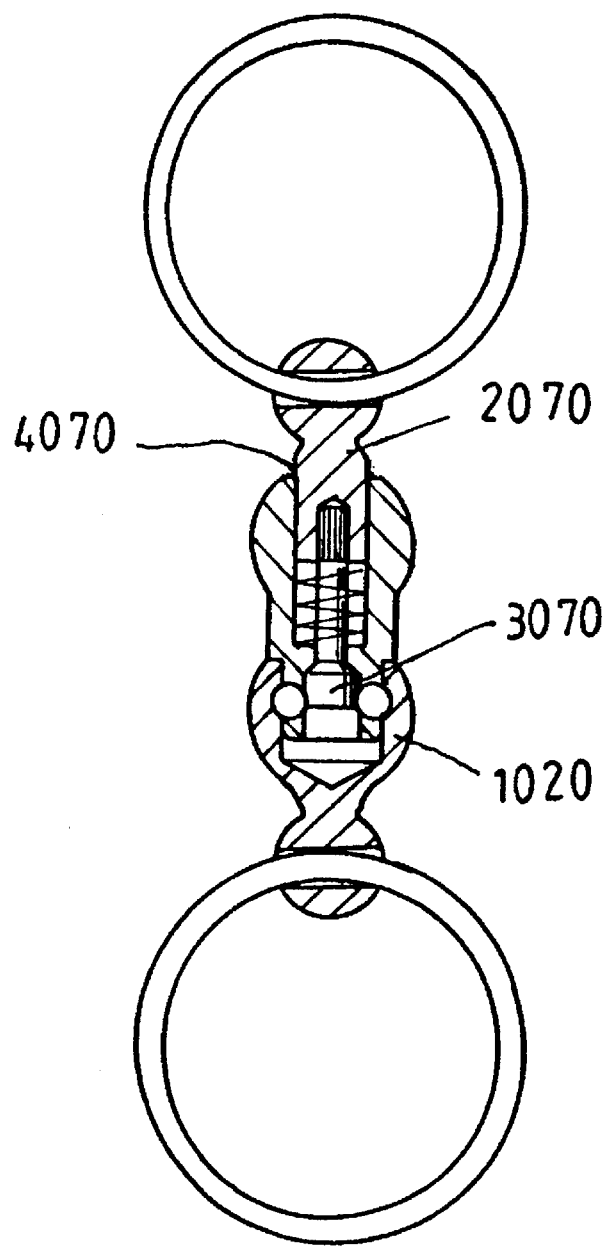
FIG. 9 shows an alternate form of the fastener shown in FIG. 8.

Referring to FIGS. 8 and 9, therein illustrated is a fastener according to a fourth embodiment of the present invention, generally comprised of a first swivel casing 1010 having a press knob element 2070 and a second swivel casing 1020 having an actuating element 3070 connected to the press knob element 2070 of the first casing 1010. A fastener according to the fourth embodiment of the present invention is suitable for carrying key rings. In FIG. 9, the casing 1010 has a broader center hole 4070 for easy installation of the press knob element 2070.

Figure 10:
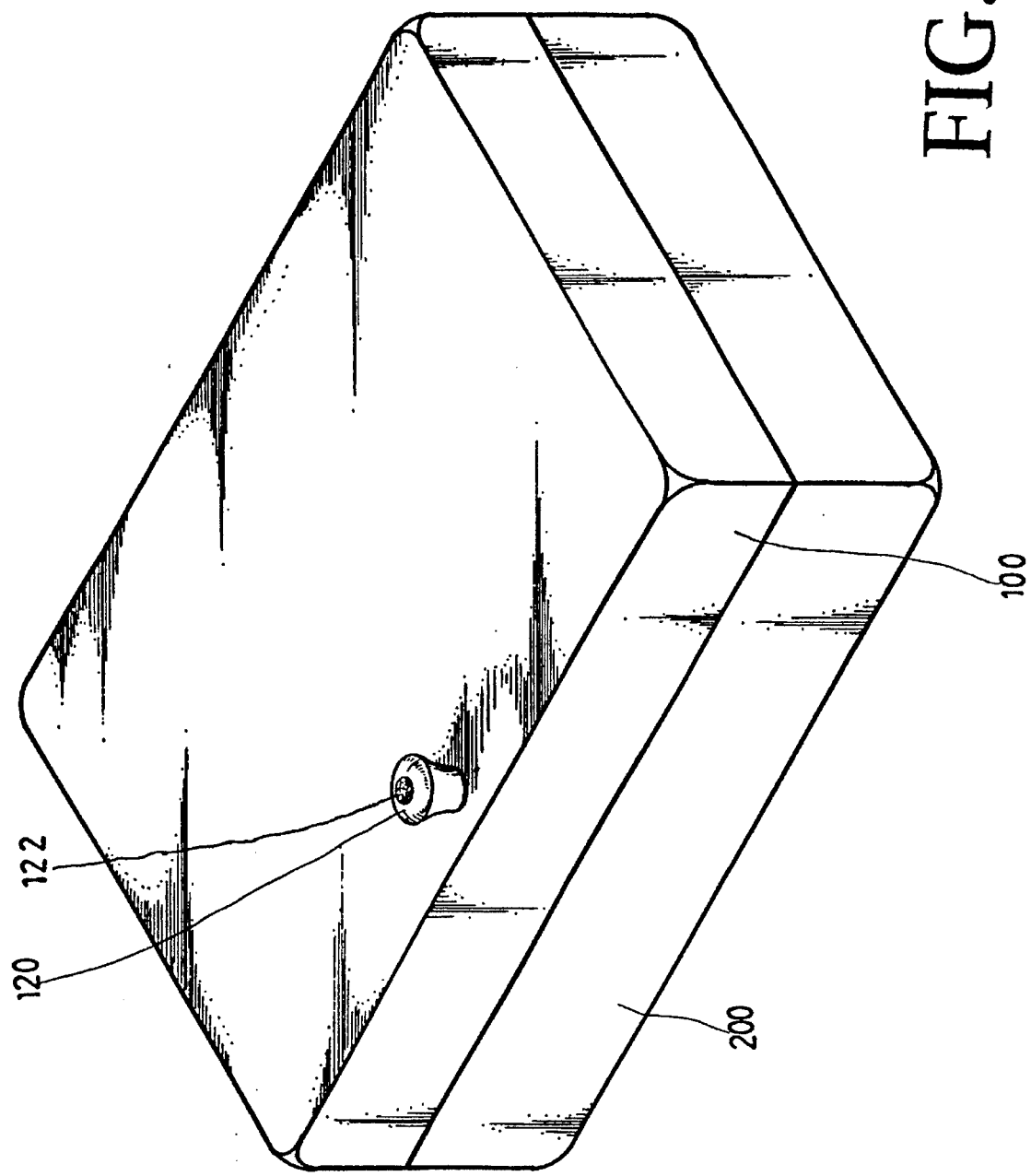
FIG. 10 is an elevational view of a fastener according to a fifth embodiment of the present invention.
Figure 11:
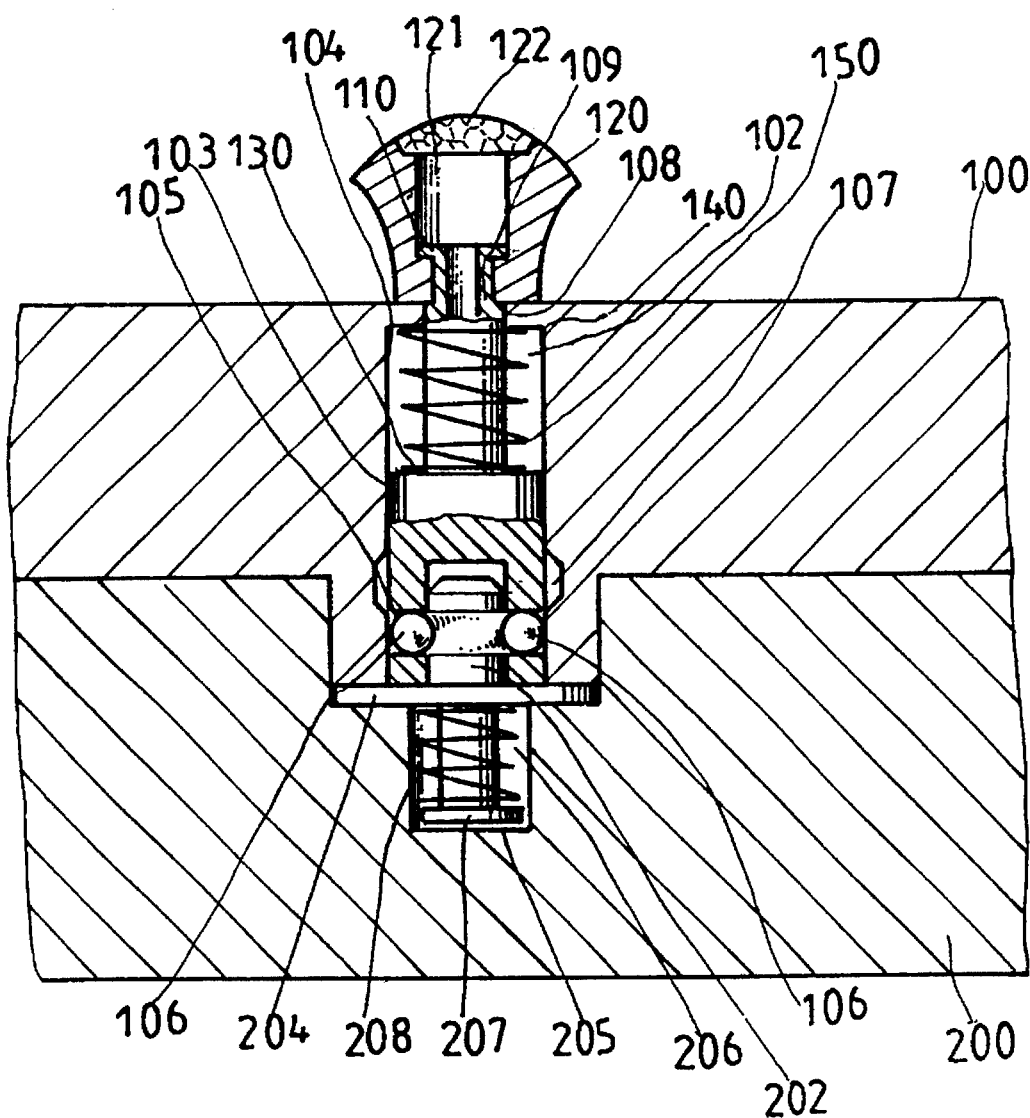
FIG. 11 is a sectional view of the fastener shown in FIG. 10.

Referring to FIGS. 10 and 11, therein illustrated is a fastener according to a fifth embodiment of the present invention, specifically designed for fastening the top cover shell 100 and bottom cover shell 200 of a box. The top cover shell 100 has a projecting portion 101 on the front wall thereof in the middle fitted into a recessed portion 201 on the bottom cover shell 200. A bearing plate 204 is mounted on the bottom of the recessed portion 201. A movable lock bolt 202 is disposed inside the recessed portion 201, having an elongated bolt body 205 inserted through a hole (not shown) on the bearing plate 204 and terminated in an expanded end 207 received in a small hole 206 beneath the bearing plate 204. A first coil spring 208 is mounted around the bolt body 205 and stopped between the bearing plate 204 and the expanded end 207. An elongated hole 102 is made through the projecting portion 101 and the height of the front wall of the top cover shell 100. A stepped bushing 103 is disposed inside the elongated hole 102. Therefore, the peripheral wall 104 of the elongated hole 102 serves as a sleeve covered around the stepped bushing 103. Radial holes 105 are made around the peripheral of the stepped bushing 103 corresponding to a neck portion 203 around the head of the lock bolt 202. A steel ball 106 is respectively inserted in each radial hole 105. An annular groove 107 is made around the peripheral wall 104 above the radial holes 105. The elongated hole 102 has a top end terminating in a small hole 108. The stepped bushing 103 has a top extension rod 109 extended out of the reduced inner diameter 108 and coupled to a knob 120. The knob 120 has a mounting hole 121 at the bottom for receiving the outward flange 110 on the top of the top extension rod 109, and an ornament 122 on the top thereof. The top extension rod 109 of the stepped bushing 103 has a shoulder portion 130. A second coil spring 150 is mounted around the stepped bushing 103 and stopped between the shoulder portion 130 and the shoulder 140 between the small hole 108 and the elongated hole 103.

Figure 12:
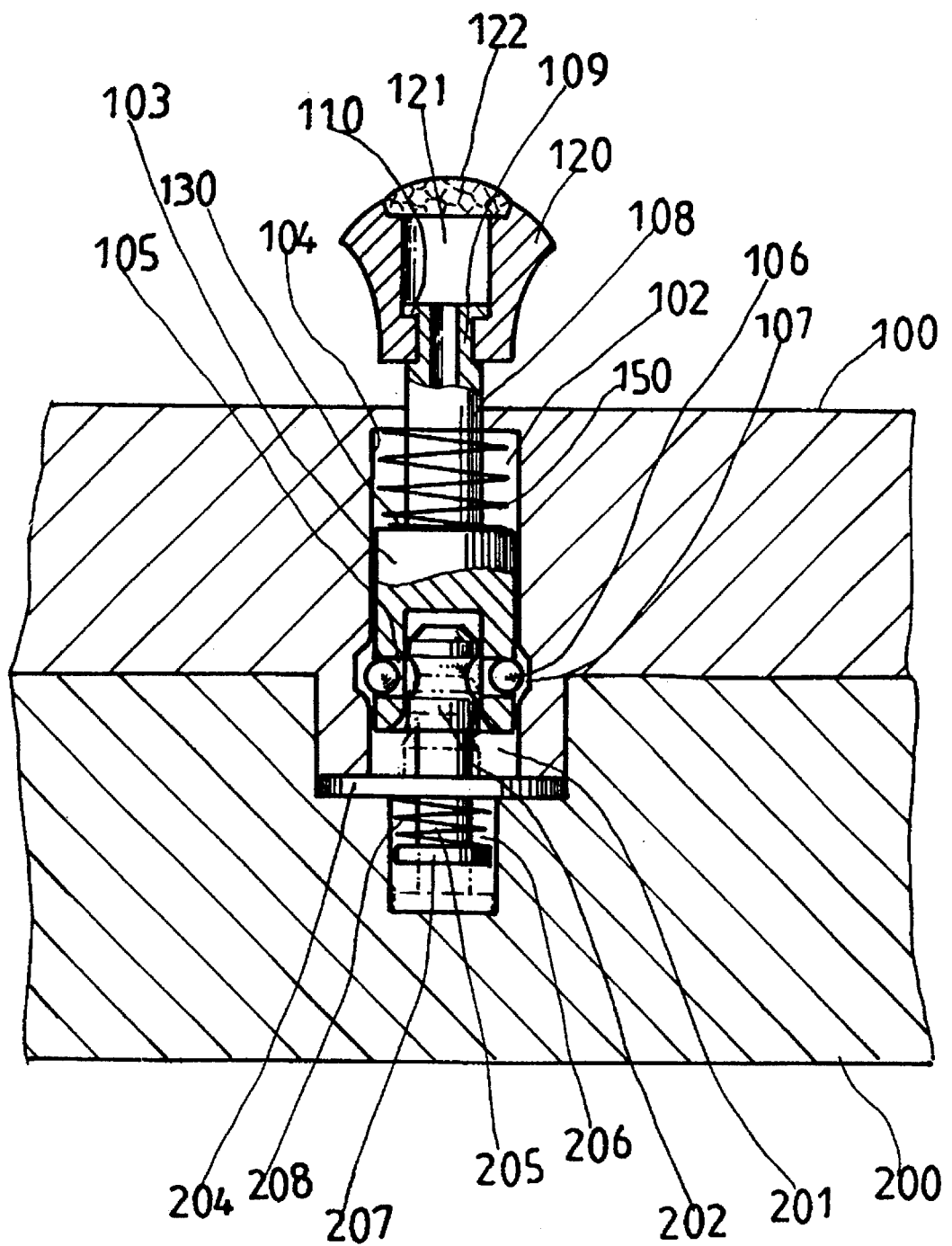
FIG. 12 is a cross section taken on FIG. 11.
Figure 13:
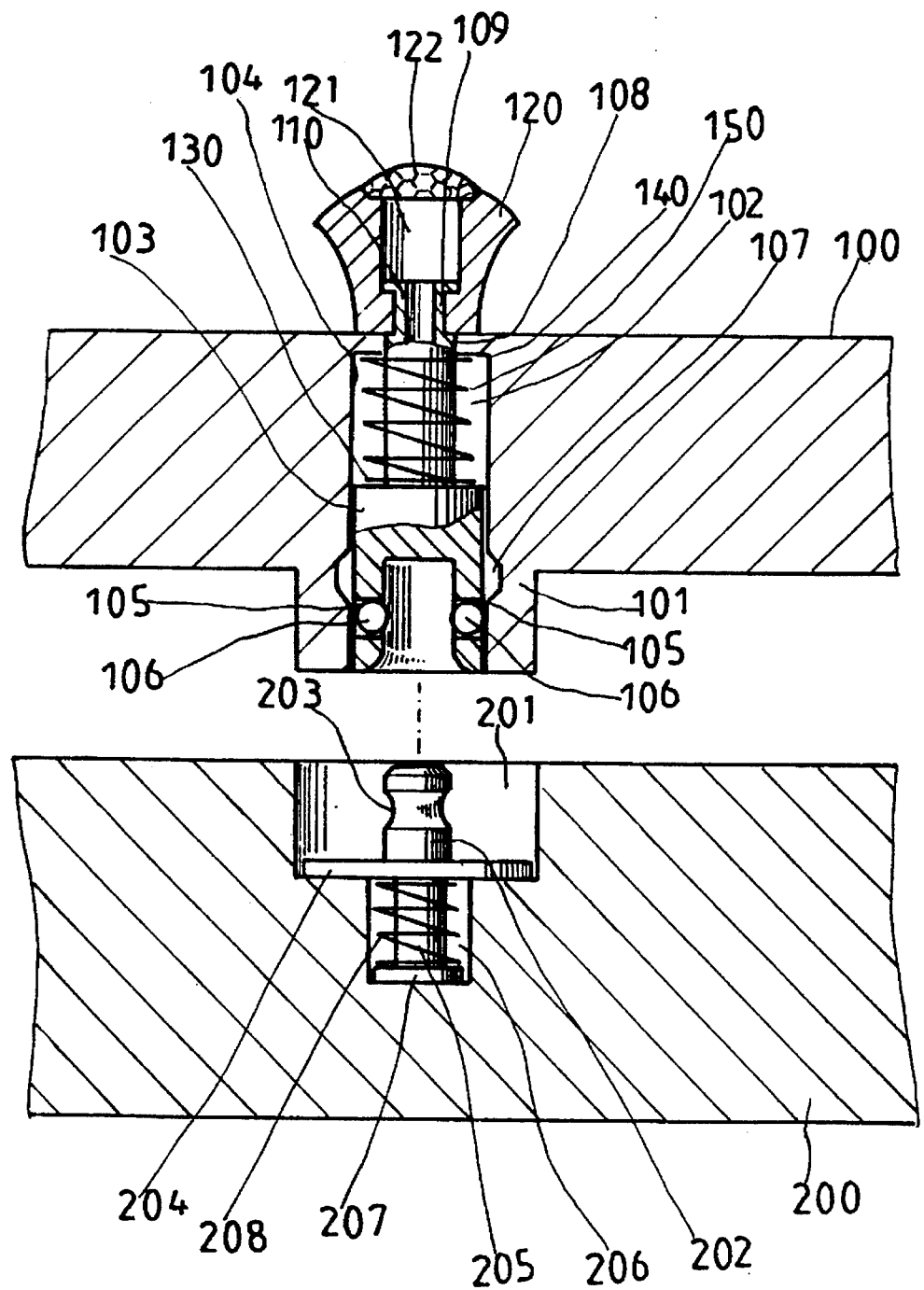
FIG. 13 is similar to FIG. 12 but showing the top cover shell opened from the bottom cover shell.

Referring to FIGS. 12 and 13, when the knob 120 is pulled upwards from the top cover shell 100, the stepped bushing 103 and the lock bolt 202 are simultaneously pulled upwards causing the second coil springs 150;208 compressed. When the steel balls 106 are moved to the elevation of the inside annular groove 107, the lock bolt 202 is released from the constraint of the steel balls 106, and therefore the top cover shell 100 can be opened (see FIG. 13).

On the contrary, when the projecting portion 101 fits into the recessed portion 201 as the top cover shell 100 is closed on the bottom cover shell 200, the second coil spring 150 is returned to its normal shape causing the steel balls 106 to engage the neck portion 203 of the lock bolt 202, and therefore the top cover shell 110 is retained closed on the bottom cover shell 200.

While only few embodiments of the present invention have been shown and described, it will be understood that various modifications and changes could be made without departing from the spirit and scope of the invention.

What is claimed is:

1. A fastener comprising:

a lock bolt inserted through a hole on a bearing plate in a recessed portion on a first cover shell of a box, said lock bolt having a first head and a second head at two opposite ends disposed on two opposite sides by said bearing plate, said first head having an annular groove around the periphery;

a first spring mounted around said lock bolt and retained between said bearing plate and said second head of said lock bolt;

a stepped bushing received in an elongated hole on a second cover shell of said box, the elongated hole of said second cover shell having an inside annular groove around the peripheral wall thereof, said stepped bushing having a plurality of steel balls respectively received in a plurality of radial holes thereof at the bottom corresponding to the annular groove on said lock bolt, and a top extension rod extended out of said second cover shell;

a knob connected to said top extension rod of said stepped bushing and disposed outside said second cover shell;

a spring mounted around said stepped bushing and stopped between a shoulder portion on said stepped bushing and a shoulder portion on said second cover shell; and wherein said steel balls are respectively engaged into the annular groove on said lock bolt, when said second cover shell is covered on said first cover shell, causing said stepped bushing and said lock bolt to connect said first and second cover shells; said steel balls are released from the annular groove on said lock bolt and partially projected into the annular groove on the elongated hole on said second cover shell to allow said second cover shell to be opened from said first cover shell.

2. The fastener of claim 1 wherein the top extension rod of said stepped bushing has an outward flange around a top end thereof retained in a bottom hole on said knob.

* * * * *